United States Patent [19]
Van Wynsberghe et al.

[11] Patent Number: 5,979,935
[45] Date of Patent: Nov. 9, 1999

[54] APPARATUS AND METHOD FOR SENSING GAS PRESSURE INSIDE AN INFLATOR

[75] Inventors: Roy D. Van Wynsberghe; Bryan W. Shirk; Timothy A. Swann; Thomas H. Deming, all of Mesa; Jess A. Cuevas, Scottsdale; Ahmad K. Al-Amin, Highley, all of Ariz.

[73] Assignee: TRW Inc., Lyndhurst, Ohio

[21] Appl. No.: 08/986,243

[22] Filed: Dec. 5, 1997

[51] Int. Cl.$^6$ .......................... B60R 21/26; B60R 21/32
[52] U.S. Cl. .................. 280/735; 380/741; 340/451; 340/626
[58] Field of Search .................. 280/735, 736, 280/737, 741; 340/451, 626

[56] References Cited

U.S. PATENT DOCUMENTS

| | | | |
|---|---|---|---|
| 3,869,143 | 3/1975 | Merrell | 280/737 |
| 4,049,935 | 9/1977 | Gruber | 280/736 |
| 4,458,173 | 7/1984 | Kaufman et al. | |
| 4,504,761 | 3/1985 | Triplett | |
| 5,076,607 | 12/1991 | Woods et al. | 280/737 |
| 5,347,870 | 9/1994 | Docsh et al. | |
| 5,619,997 | 4/1997 | Kaplan | |
| 5,799,972 | 9/1998 | Handman et al. | 280/735 |
| 5,869,745 | 2/1999 | Schroeder et al. | 280/735 |

Primary Examiner—Peter C. English
Attorney, Agent, or Firm—Tarolli, Sundheim, Covell, Tummino & Szabo

[57] ABSTRACT

An apparatus (10) comprises an inflatable vehicle occupant protection device (12) and an inflator (20) for inflating the inflatable vehicle occupant protection device. The inflator (20) has a wall (32) defining a chamber (40) in the inflator. Inflation fluid is stored at a predetermined pressure in the chamber (40). The apparatus (10) further comprises a first device (102) for generating electrical energy. The first device (102) is located in the chamber (40). A second device (106, 108) senses a change in the predetermined pressure and transmits a signal indicative of the change in the predetermined pressure through the wall (32). The second device (106, 108) is located inside the chamber (40) and is electrically connected to the first device (102). A third device (122, 124) senses the signal. The third device (122, 124) is located outside of the chamber (40).

15 Claims, 1 Drawing Sheet

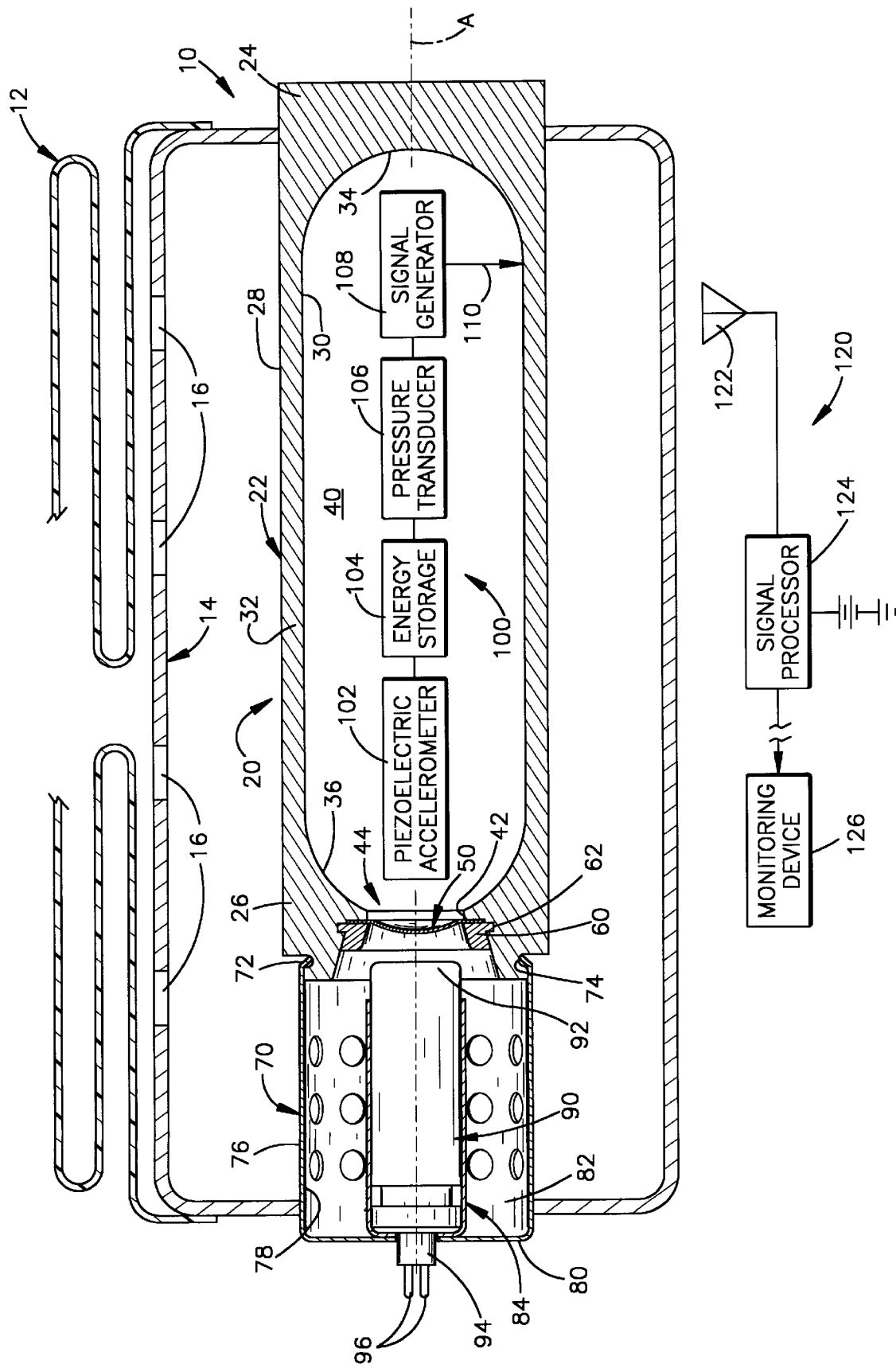

APPARATUS AND METHOD FOR SENSING GAS PRESSURE INSIDE AN INFLATOR

TECHNICAL FIELD

The present invention relates to an apparatus and method for sensing gas pressure inside an inflator for inflating an inflatable vehicle occupant protection device.

BACKGROUND OF THE INVENTION

It is known to inflate an inflatable vehicle occupant protection device, such as an air bag, using gas contained at a predetermined elevated pressure inside a chamber in an air bag inflator. It is also known to sense and/or monitor the pressure level of the gas inside the chamber. Typically, to sense the pressure level, a pressure sensor or electrical wiring extending from a pressure sensor passes through an opening in a wall of the inflator.

SUMMARY OF THE INVENTION

The present invention is an apparatus comprising an inflatable vehicle occupant protection device and an inflator for inflating the inflatable vehicle occupant protection device. The inflator has at least one wall defining a chamber in the inflator. Inflation fluid is stored at a predetermined pressure in the chamber. The apparatus further comprises first means for generating electrical energy. The first means is located in the chamber. Second means is provided for sensing a change in the predetermined pressure and for transmitting a signal indicative of the change in the predetermined pressure through the at least one wall. The second means is located inside the chamber and is electrically connected to the first means. Third means is provided for sensing the signal. The third means is located outside of the chamber.

The present invention further provides a method for sensing inflation fluid pressure in an inflator. The method includes generating electrical energy in a chamber in the inflator and using the generated electrical energy to transmit a signal indicative of a change in pressure inside the chamber to means for receiving the signal located outside the chamber.

BRIEF DESCRIPTION OF THE DRAWINGS

The foregoing and other features of the present invention will becomes apparent to one skilled in the art to which the present invention relates upon consideration of the following description of the invention with reference to the accompanying drawing, wherein:

The FIGURE is a schematic illustration of a portion of an inflatable vehicle occupant protection device module constructed in accordance with the present invention.

DESCRIPTION OF PREFERRED EMBODIMENTS

The present invention relates to an apparatus and method for sensing gas pressure inside an inflator for inflating an inflatable vehicle occupant protection device. The inflator and the inflatable vehicle occupant protection device are parts of a vehicle occupant protection device module. The present invention is applicable to vehicle occupant protection device modules of various constructions. As representative of one such construction, FIG. 1 illustrates an inflatable vehicle occupant protection device module 10 mounted in a vehicle (not shown). The inflatable vehicle occupant protection device module 10 shown in FIG. 1 is a particular type of inflatable vehicle occupant protection device commonly referred to as an air bag 12. Other inflatable vehicle occupant protection devices that can be used in accordance with the present invention include inflatable seat belts, inflatable knee bolsters, inflatable head liners or side curtains, and knee bolsters operated by inflatable air bags. The inflatable vehicle occupant protection device module 10 further comprises a diffuser 14 and an inflator 20 for inflating the air bag 12.

The air bag 12 is secured in a known manner (not shown) in the inflatable vehicle occupant protection device module 10. The diffuser 14 is tubular in shape and encircles the inflator 20. The diffuser 14 spaces the air bag 12 from the inflator 20. The diffuser 14 includes a plurality of diffuser openings 16 through which inflation fluid, typically in the form of a gas, from the inflator 20 passes to inflate the air bag 12.

The inflator 20 comprises a cylindrical inflator body 22 centered on an axis A. The inflator body 22 has opposing first and second end portions 24 and 26, respectively. The inflator body 22 includes a cylindrical outer surface 28 and a cylindrical first inner surface 30. A side wall 32 of the inflator body 22 is defined between the outer surface 28 and the first inner surface 30.

Adjacent the first end portion 24, the inflator body 22 has an arcuate second inner surface 34 which is connected to the first inner surface 30. The inflator body 22 further has an arcuate third inner surface 36 adjacent the second end portion 26. The third inner surface 36 is also connected to the first inner surface 30. The first inner surface 30, the second inner surface 34, and the third inner surface 36 together define a chamber 40 inside the inflator body 22.

An axially extending fourth inner surface 42 extends generally parallel to the axis A from the third inner surface 36 in the second end portion 26 of the inflator body 22. The fourth inner surface 42 defines an outlet opening 44 in the inflator body 22. The outlet opening 44 is circular in cross-section and is centered on the axis A.

The inflator 20 includes a rupturable burst disk 50. The burst disk 50 covers and sealingly closes the outlet opening 44 in the inflator body 22. The burst disk 50 is secured in place in any suitable manner. As illustrated, the burst disk 50 is secured in place by a retaining ring 60. The retaining ring 60 fits into an annular groove 62 adjacent the outlet opening 44 in the inflator body 22.

The inflator 20 further includes a cylindrical manifold 70 centered on the axis A. The manifold 70 is secured to the second end portion 26 of the inflator body 22 by crimping an end portion 72 of the manifold into an annular recess 74 in the outer surface 28 of the inflator body 22. The manifold 70 could also be attached to the inflator body 22 by welding or other suitable means.

The manifold 70 includes parallel, cylindrical outer and inner surfaces 76 and 78, respectively, and a radially extending end wall 80. The inner surface 78 defines a chamber 82 inside the manifold 70. A cup-shaped support member 84 extends axially from the end wall 80 into the chamber 82 in the manifold 70. The support member 84 supports an electrically actuatable igniter 90. The igniter 90 has a first end 92 disposed adjacent the burst disk 50. The igniter 90 has a second end 94 which includes a pair of electrical connector pins 96 that extend through the end wall 80 of the manifold 70.

The inflator 20 includes inflation fluid in the form of gas for inflating the air bag 12. The gas is placed into the chamber 40 in the inflator body 22 at a predetermined pressure of approximately 2500 psi. The gas preferably comprises a combustible mixture of gases, as is known in the art.

The inflatable vehicle occupant protection device module 10 further includes a first circuit 100 located inside the chamber 40 in the inflator body 22 and a second circuit 120 located outside the inflator body. The first circuit 100 is secured in the chamber 40 in a manner not shown. The first circuit 100 comprises a piezoelectric accelerometer 102, an energy storage device 104, a pressure transducer 106, and a signal generator 108.

The piezoelectric accelerometer 102 employs a piezoelectric crystal to generate electrical energy (in the form of voltage) when subjected to mechanical forces, such as vibration. The energy storage device 104 is electrically connected to the piezoelectric accelerometer 102. The energy storage device 104 is operable to store electrical energy generated by the piezoelectric accelerometer 102. The energy storage device 104 preferably comprises one or more capacitors.

The pressure transducer 106 is electrically connected to the energy storage device 104. The pressure transducer 106 is powered by electrical energy generated by the piezoelectric accelerometer 102 and stored by the energy storage device 104. The pressure transducer 106 is operable to sense the static pressure of the gas in the chamber 40 in the inflator body 22 and to create an electrical output indicative of the sensed pressure. The pressure transducer 106 preferably comprises a strain gage type device.

The signal generator 108 is operatively coupled to the pressure transducer 106. The signal generator 108 is operable to receive an electrical output from the pressure transducer 106. The signal generator 108 includes circuitry for sensing a change in pressure in the chamber 40. To sense such a change, the signal generator 108 compares the sensed pressure level contained in the output from the transducer 106 with the predetermined pressure level which has been stored as a reference value in the circuitry of the signal generator. The signal generator 108 is further operable to generate an RF signal indicative of a change in the pressure level of a predetermined magnitude, for example, 100 psi, and to transmit the RF signal through the wall 32 of the inflator body 22 when such a change in pressure occurs. The signal generator 108 is operatively coupled to the wall 32 of the inflator body 22, as indicated by line 110, so that the inflator body functions as an antenna for transmitting the RF signal.

The second circuit 120 is secured in the vehicle in a location near the inflatable vehicle occupant protection device module 10. The second circuit 120 comprises a receiving antenna 122 and a signal processor 124. The receiving antenna 122 is operable to receive the RF signal transmitted by the signal generator 108 through the wall 32 of the inflator body 22. The signal processor 124 is operatively coupled to the receiving antenna 122 and is also electrically connected to a source of electrical power in the vehicle, such as the vehicle battery. The signal processor 124 includes circuitry for interpreting the transmitted RF signal and for sending an output corresponding to the transmitted signal to a monitoring device 126 located elsewhere in the vehicle.

When the vehicle is driven, the vehicle vibrates, causing the inflatable vehicle occupant protection device module 10 to vibrate. Vibration of the inflatable vehicle occupant protection device module 10 in turn causes the piezoelectric accelerometer 102 to vibrate and to generate electrical energy. Electrical energy generated by the piezoelectric accelerometer 102 is sent to the energy storage device 104, where it is stored. When a sufficient amount of electrical energy has been stored in the energy storage device 104, the energy is discharged to the pressure transducer 106 to power the pressure transducer.

The pressure transducer 106 senses the static pressure of the gas inside the chamber 40 in the inflator body 22 and sends an electrical signal indicative of the sensed pressure to the signal generator 108. The signal generator 108 senses whether a change in the pressure has occurred by comparing the sensed pressure level with the predetermined pressure level. When a change in pressure greater than or equal to the predetermined magnitude occurs, the signal generator 108 generates an RF signal indicative of the change in pressure. The RF signal is then transmitted out of the chamber 40 by the signal generator 108 through the wall 32 of the inflator body 22.

Outside the inflator 20, the receiving antenna 122 receives the transmitted RF signal and passes it to the signal processor 124. The signal processor 124 processes the RF signal and sends a corresponding output to the monitoring device which notifies the vehicle operator of the change in pressure inside the chamber 40 in the inflator body 22. In this way, the vehicle operator is notified if the pressure in the chamber 40 is too high or too low so that the inflator 20 can then be serviced. It is contemplated that the signal processor 124 could also simultaneously send a signal to a repair facility to notify the repair facility that service on the inflator 20 is required.

In accordance with a second embodiment of the present invention, the signal generator 108 comprises an ultrasonic wave generator. The signal generator 108 generates and transmits ultrasonic waves containing a signal indicative of a change in pressure in the chamber 40 as coded information. The ultrasonic waves are induced into the inflator body 22 for transmission through the wall 32 of the inflator body. The receiving antenna 122 is operable to receive the transmitted ultrasonic waves and to send them to the signal processor 124. The signal processor 124 then decodes the pressure signal and sends a corresponding output to the monitoring device 126.

The second embodiment of the present invention thus functions similar to the first embodiment to provide the vehicle operator with an indication of a change in gas pressure in the inflator 20.

It is further contemplated that the signal generator 108 could alternatively generate and transmit sonic waves to the receiving antenna 122 rather than ultrasonic waves or RF signals.

From the above description of the invention, those skilled in the art will perceive improvements, changes and modifications. Such improvements, changes and modifications within the skill of the art are intended to be covered by the appended claims.

Having described the invention, we claim:

1. An apparatus comprising:
   an inflatable vehicle occupant protection device;
   an inflator for inflating said inflatable vehicle occupant protection device, said inflator having at least one wall defining a chamber in said inflator;
   inflation fluid stored at a predetermined pressure in said chamber;
   first means for generating electrical energy, said first means being located in said chamber;

second means for sensing a change in said predetermined pressure and for transmitting a signal indicative of said change in said predetermined pressure through said at least one wall, said second means being located inside said chamber and being electrically connected with said first means; and third means for sensing said signal, said third means being located outside of said chamber.

2. An apparatus as defined in claim 1 wherein said first means generates electrical energy in response to vehicle vibration.

3. An apparatus as defined in claim 1 wherein said second means inside said chamber comprises a signal generator for transmitting said signal through the material of said at least one wall.

4. An apparatus as defined in claim 3 wherein said signal generator comprises a radio frequency transmitter.

5. An apparatus as defined in claim 3 wherein said signal generator comprises an ultrasonic wave generator.

6. An apparatus as defined in claim 3 wherein said second means inside said chamber further comprises means for storing electrical energy generated by said first means and means for sensing inflation fluid pressure in said chamber and for controlling operation of said signal generator in accordance with said sensed inflation fluid pressure, said means for sensing inflation fluid pressure in said chamber and for controlling operation of said signal generator being electrically connected with said means for storing electrical energy.

7. An apparatus as defined in claim 6 wherein said first means for generating electrical energy comprises a piezoelectric accelerometer.

8. An apparatus as defined in claim 6 wherein said means for storing energy comprises at least one capacitor.

9. An apparatus as defined in claim 6 wherein said means for sensing inflation fluid pressure in said chamber and for controlling operation of said signal generator comprises a pressure transducer.

10. A method comprising the steps of:

providing an inflatable vehicle occupant protection device and an inflator for inflating said inflatable vehicle occupant protection device, said inflator having at least one wall defining a chamber in said inflator;

storing an inflation fluid at a predetermined pressure in said chamber;

locating in said chamber first means for generating electrical energy;

locating in said chamber second means for sensing a change in said predetermined pressure and for transmitting a signal indicative of said change in said predetermined pressure through said at least one wall, operatively coupling said second means to said first means; and locating outside said chamber third means for sensing said signal.

11. The method as defined in claim 10 further comprising the step of:

generating electrical energy in said chamber in response to vehicle vibration.

12. A method as defined in claim 11 further comprising the step of:

locating in said chamber fourth means for storing electrical energy generated by said first means, said fourth means being operatively coupled to said first means and to said second means.

13. A method for sensing gas pressure in an inflator for inflating an inflatable vehicle occupant protection device, said method comprising the steps of:

providing the inflator with at least one wall defining a chamber in the inflator;

storing inflation fluid at a predetermined pressure in said chamber;

generating electrical energy in said chamber;

supplying said electrical energy to means for sensing inflation fluid pressure in said chamber;

sensing a change in said predetermined pressure of said inflation fluid in said chamber using said means for sensing inflation fluid pressure;

creating a signal indicative of said change in said predetermined pressure of said inflation fluid;

supplying said signal to means for transmitting said signal through said at least one wall; and receiving said signal outside said chamber using means for receiving a signal.

14. The method as defined in claim 13 wherein said step of generating electrical energy comprises generating electrical energy in response to vehicle vibration.

15. The method as defined in claim 14 further comprising the step of:

storing in said chamber said electrical energy generated in said chamber.

* * * * *